United States Patent
Veraart et al.

(10) Patent No.: US 10,066,094 B2
(45) Date of Patent: *Sep. 4, 2018

(54) HIGH IMPACT POLYSTYRENE HAVING HIGH MODULUS AND RESISTANCE TO ENVIRONMENTAL STRESS CRACKING

(71) Applicant: TRINSEO EUROPE GMBH, Horgen (CH)

(72) Inventors: Rudi Veraart, Aardenburg (NL); Gilbert Bouquet, Ghent (BE); Mark Georges Vreys, Oostakker (BE); Ronald Van Daele, Belsele (BE); Alexander De Bokx, Assenede (BE)

(73) Assignee: TRINSEO EUROPE GMBH, Horgen (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/241,142

(22) Filed: Aug. 19, 2016

(65) Prior Publication Data

US 2016/0355674 A1    Dec. 8, 2016

Related U.S. Application Data

(63) Continuation of application No. 14/769,500, filed as application No. PCT/EP2013/053801 on Feb. 26, 2013, now Pat. No. 9,453,125.

(51) Int. Cl.
| | | |
|---|---|---|
| *C08L 51/04* | (2006.01) | |
| *C08L 25/06* | (2006.01) | |
| *C08F 279/02* | (2006.01) | |

(52) U.S. Cl.
CPC ............ *C08L 25/06* (2013.01); *C08F 279/02* (2013.01); *C08L 51/04* (2013.01); *C08L 2205/06* (2013.01); *C08L 2205/22* (2013.01)

(58) Field of Classification Search
CPC ......... C08L 51/04; C08L 25/06; C08F 279/02
See application file for complete search history.

(56) References Cited

U.S. PATENT DOCUMENTS

| | | | |
|---|---|---|---|
| 4,144,204 A | 3/1979 | Mittnacht et al. | |
| 4,572,819 A | 2/1986 | Priddy et al. | |
| 4,585,825 A | 4/1986 | Wesselmann | |
| 4,666,987 A | 5/1987 | Burmester et al. | |
| 6,350,813 B1 | 2/2002 | Schrader | |
| 6,353,066 B1 | 3/2002 | Sosa | |
| 2004/0001962 A1* | 1/2004 | Reddy | C08F 279/02 428/500 |
| 2010/0204397 A1* | 8/2010 | Kobayashi | C08K 5/005 524/575 |
| 2010/0197863 A1 | 9/2010 | Bouquet et al. | |
| 2011/0166295 A1 | 7/2011 | Bouquet et al. | |
| 2011/0218292 A1 | 9/2011 | Cochran et al. | |
| 2012/0202949 A1* | 8/2012 | Bouquet | C08F 257/02 525/233 |

FOREIGN PATENT DOCUMENTS

| | | |
|---|---|---|
| CN | 1842552 A | 10/2006 |
| KR | 1020120093184 A1 | 8/2012 |
| WO | 2010/103007 A1 | 9/2010 |
| WO | 2011/042178 A1 | 4/2011 |

OTHER PUBLICATIONS

Jordilabs White Paper Mw Averages Explanation 2014.*
Scheirs et al. Modern Styrenic Polymers 2003.*
International Search Report from for International Patent Application No. PCT/EP2013/053801, dated Oct. 9, 2013.
International Preliminary Report on Patentability for International Patent Application No. PCT/EP2013/053801, dated Jun. 6, 2016.
Written Opinion for PCT Patent Application No. PCT/EP2013/053801, dated Oct. 9, 2013.
Office Action from the Japanese Patent Office for co-pending Japan Patent Application No. 2015-558357 dated Mar. 15, 2016.
Final Office Action from the Korean Patent Office for co-pending Korea Patent Application No. 10-2015-7019929 dated Feb. 5, 2016.
Office Action from the Korean Patent Office for co-pending Korea Patent Application No. 10-2015-7019929 dated Sep. 10, 2015.
Office Action from the Chinese Patent Office for co-pending Chinese Patent Application No. 201380071971.9 dated Jun. 17, 2016.
Office Action from the European Patent Office for co-pending European Patent Application No. 13706514.04 dated Jul. 6, 2016.
Russian Office Action, RU Application No. 2015131834 dated Oct. 11, 2017.

* cited by examiner

*Primary Examiner* — Mark S Kaucher
(74) *Attorney, Agent, or Firm* — The Dobrusin Law Firm, P.C.

(57) ABSTRACT

High impact polystyrenes and related monovinyl aromatic polymers generally have either a high modulus or good resistance to environmental stress cracking. The present invention is directed at polymeric materials having both a high modulus and good resistance to environmental stress cracking thus enabling the down gauging of parts, and or the use of the materials in new applications. The invention is predicated on the use of one or more, or even all of the following features: a high molecular weight matrix polymer, reduced concentration of elastomeric polymer, or methods that result in large rubber particle size.

20 Claims, No Drawings

HIGH IMPACT POLYSTYRENE HAVING HIGH MODULUS AND RESISTANCE TO ENVIRONMENTAL STRESS CRACKING

FIELD OF THE INVENTION

The invention is related to polymeric materials having good resistance to environmental stress cracking. In particular, the invention is related to polymeric materials having improved balance of tensile properties and resistance to environmental stress cracking so that cost benefits associated with down gauging can be achieved.

BACKGROUND OF THE INVENTION

Various approaches have been made to provide rubber reinforced monovinyl aromatic polymers having good resistance to environmental stress cracking (i.e., good ESCR). These include the use of multi-layer sheet technology, increasing the amount of rubber, increase gel phase volume, optimizing the rubber particle size, controlling the amount of cross linking of the rubber, optimizing the process, the use of additives such as polypropylene, polybutylene, and ethylene/α-olefin copolymers, and the use of high molecular weight rubber. Some of these approaches and related technologies are described for example in US Patent Application Publication Nos. US2011/0166295 A1 (published on Jul. 7, 2011), US2010/0197863 A1 (published on Aug. 5, 2010), and US2011/0218292 A1 (published on Sep. 8, 2011); and U.S. Pat. No. 6,350,813 B1 (issued on Feb. 26, 2002), U.S. Pat. No. 4,144,204 (issued on Mar. 13, 1979), and U.S. Pat. No. 6,353,066 B1 (issued on Mar. 5, 2002), all incorporated herein by reference in their entireties. However, these approaches have had varying effects on other performance properties. For example, many of these approaches require generally a high concentration of impact modifier (rubber). In particular, when using low concentrations of rubber and high concentration of monovinyl aromatic polymer matrix (e.g., in a reactor blend where one or more monovinyl aromatic monomers are polymerized in the presence of rubber), there is generally a need to make low molecular weight monovinyl aromatic polymer matrix in order to obtain sufficiently large rubber particles for providing good ESCR.

Because of the low modulus of many compositions having good resistance to environmental stress cracking, rigid parts made of these materials are required to have generally thick walls. Thus, there continues to be a need for polymeric composition having a combination of good ESCR and high modulus, so that parts in existing applications can be down gauged and/or so that the material can be used in new applications for rubber reinforced monovinyl aromatic polymer compositions. For example, such improved balance of ESCR and modulus may allow for down gauging of liners used in refrigerators and freezers. There is also a need for such improved materials having one or more of (e.g., all of) the following characteristics: high heat distortion temperature, good impact strength, good processability, low cost, high Vicat softening point, good tensile properties, good tensile modulus, good flexural modulus, and the like.

SUMMARY OF THE INVENTION

One or more of the aforementioned needs are met using the compositions according to the teachings herein. Preferred compositions have a combination of good resistance to environmental stress cracking and high modulus.

One aspect of the invention is directed at a composition comprising: a rubber-modified monovinyl aromatic polymer including about 90 weight percent or more of a rigid monovinyl aromatic polymer matrix, based on the total weight of the composition; and from about 2 to about 7.5 weight percent of one or more elastomeric polymers, based on the total weight of the composition. Preferably, the elastomeric polymer is present as grafted and occluded rubber particles dispersed within the monovinyl aromatic polymer matrix. The monovinyl aromatic polymer may include one or more monovinyl aromatic monomers. The monovinyl aromatic polymer preferably includes about 60 weight percent or more styrene monomer, based on the total weight of the monovinyl aromatic polymer. The monovinyl aromatic polymer may have a sufficiently high molecular weight so that the ESCR elongation at break after 10 days in corn oil at 1% strain is about 15% or more. Preferably, the molecular weight of the monovinyl aromatic polymer is characterized by a weight average molecular weight of 200,000 g/mol or more (more preferably 205,000 g/mol or more), and a polydispersity index of about 2 or more.

Another aspect of the invention is directed at an article including a composition according to the teachings herein. Preferred articles include liners, such as liners for appliance.

Another aspect of the invention is directed at a process for preparing a composition according to the teachings herein.

Another process related aspect of the invention is directed at a method of forming an article using a composition according to the teachings herein.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

As used herein, a "polymer" is a polymeric compound prepared by polymerizing monomers, whether of the same or a different type. The generic term polymer thus embraces the term homopolymer, usually employed to refer to polymers prepared from only one type of monomer, and the terms copolymer and interpolymer as defined below.

As used herein, a "copolymer", "interpolymer" and like terms means a polymer prepared by the polymerization of at least two different types of monomers. These generic terms include the traditional definition of copolymers, i.e., polymers prepared from two different types of monomers, and the more expansive definition of copolymers, i.e., polymers prepared from more than two different types of monomers, e.g., terpolymers, tetrapolymers, etc.

As used herein, "blend", "polymer blend" and like terms refer to a composition of two or more compounds, typically two or more polymers. As used herein, "blend" and "polymer blend" also includes "reactor blends," such as where a monomer is polymerized in the presence of a polymer. For example, the blend may initially be a blend of a first polymer and one or more monomers which are then polymerized to form a second polymer. A blend may or may not be miscible. A blend may or may not be phase separated. A blend may or may not contain one or more domain configurations, as determined from transmission electron spectroscopy, light scattering, x-ray scattering, or any other method known in the art. Preferred blends (e.g., preferred reactor blends) including two or more phases. For example the blend may include a first phase including some or all of the monovinyl aromatic polymer and a second phase including some or all of the rubber. In the context of this invention, blend includes the chemical and/or physical coupling of the monovinyl aromatic polymer with the elastomeric polymer, e.g., one polymer is grafted onto or otherwise incorporated into the other polymer.

As used herein, "composition" and like terms means a mixture or blend of two or more components. One composition of this invention is the mix of monomers, polymerization initiator and any other components necessary or desirable to make the monovinyl aromatic polymer, while another composition of this invention is the rubber-modified monovinyl aromatic polymer including the elastomeric polymer. These compositions may include other components, polymeric or non-polymeric (e.g., additives), necessary or desirable to the end use of the composition.

The compositions according to the teachings herein achieve improved balance of performance properties including good environmental stress crack resistance and generally high modulus. These improvements are predicated on one or more (or even all) of the following: a generally low concentration of elastomeric polymer, a generally high concentration of monovinyl aromatic polymer, a generally high molecular weight monovinyl aromatic polymer, or a generally larger rubber particle size.

Monovinyl Aromatic Polymers

Monovinyl aromatic homopolymers and copolymers (individually and collectively referred to as "polymers" or "copolymers") are produced by polymerizing monovinyl aromatic monomers such as those described in U.S. Pat. Nos. 4,666,987, 4,572,819 and 4,585,825. The monovinyl aromatic polymer includes, consists essentially of, or consists entirely of one or more monovinyl aromatic monomers. The monovinyl aromatic monomers suitable for producing the polymers and copolymers used in the practice of this invention are preferably of the following formula:

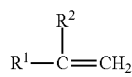

in which $R^2$ is hydrogen or methyl, $R^1$ is an aromatic ring structure having from 1 to 3 aromatic rings with or without alkyl, halo, or halo alkyl substitution, wherein any alkyl group contains 1 to 6 carbon atoms and halo alkyl refers to a halo substituted alkyl group. Preferably, $R^1$ is phenyl or alkyl phenyl (in which the alkyl group of the phenyl ring contains 1 to 10, preferably 1 to 8 and more preferably 1 to 4, carbon atoms), with phenyl being most preferred. Typical monovinyl aromatic monomers which may be used include: styrene, alpha-methyl styrene, all isomers of vinyl toluene, especially para-vinyl toluene, all isomers of ethyl styrene, propyl styrene, vinyl biphenyl, vinyl naphthalene, vinyl anthracene and the like, and mixtures thereof. Most prefer-ably, the monovinyl aromatic monomer includes, consists essentially of, or consists entirely of styrene. The concentration of the monovinyl aromatic monomers (e.g., the concentration of styrene) preferably is about 60 weight percent or more, more preferably about 65 weight percent or more, even more preferably about 70 weight percent or more, even more preferably about 80 weight percent or more, even more preferably about 90 weight percent or more, and most preferably about 93 weight percent or more, based on the total weight of the monovinyl aromatic polymer. As used herein, a monovinyl aromatic polymer that consists essentially of one or more monovinyl aromatic monomers (e.g., consists essentially of styrene) may have a concentration of monovinyl aromatic monomers (e.g., a concentration of styrene) of about 95 weight percent or more, more preferably about 98 weight percent or more, even more preferably about 99 weight percent or more, and most preferably about 99.5 weight percent or more, based on the total weight of the monovinyl aromatic polymer.

The monovinyl aromatic monomer can be copolymerized with one or more of a range of other copolymerizable monomers. Preferred comonomers include nitrile monomers such as acrylonitrile, methacrylonitrile and fumaronitrile; (meth)acrylate monomers such as methyl methacrylate or n-butyl acrylate; maleic anhydride and/or N-aryl maleimides such as N-phenyl maleimide, and conjugated and nonconjugated dienes. Representative copolymers include styrene-acrylonitrile (SAN) copolymers. The copolymers typically include the comonomer at a concentration of about 0.1 weight percent or more, preferably about 1 weight percent or more, even more preferably about 2 weight percent or more, and most preferably about 5 weight percent or more, based on weight of the copolymer. Typically, the copolymer includes the copolymer at a concentration of 40 weight percent or less, preferably about 35 weight percent or less, and most preferably about 30 weight percent or less, based on the weight of the copolymer.

The monovinyl aromatic polymer matrix may provide strength and stiffness to the composition. The monovinyl aromatic polymer matrix preferably is sufficiently rigid so that the resulting composition is suitable for use in thin walled parts, even when the composition includes a sufficient quantity of elastomeric polymer so that it has good resistance to environmental stress cracking. Preferably, the monovinyl aromatic polymer matrix is sufficiently rigid so that the composition has a flexural modulus (as measured according to ISO 178 of about 1000 MPa or more, more preferably about 1500 MPa or more, even more preferably about 1600 MPa or more, and most preferably about 1700 MPa or more. Preferably, the monovinyl aromatic polymer matrix is sufficiently rigid so that the composition has a tensile modulus (as measured according to ISO 527-1) of about 1000 MPa or more, more preferably about 1400 MPa or more, even more preferably about 1500 MPa or more, and most preferably about 1600 MPa or more The monovinyl aromatic polymer generally has a high molecular weight. The molecular weight may be characterized by the number average molecular weight ($M_n$), the weight average molecular weight ($M_w$), the z-average molecular weight ($M_z$), the polydispersity index, or any combination thereof. The molecular weight of the monovinyl aromatic polymer is measured for the fraction of the polymer that is soluble in the gel permeation chromatography solvent (e.g., in tetrahydrofuran at about 25° C.). The molecular weight of the monovinyl aromatic polymer should be sufficiently high so that the composition has good resistance to environmental stress cracking, despite having a low concentration of rubber (e.g., about 7.5 weight percent or less) and/or a generally high concentration of monovinyl aromatic polymer (e.g., about 90 weight percent or more). The weight average molecular weight of the monovinyl aromatic polymer preferably is 200,000 g/mol or more, more preferably 205,000 g/mol or more, even more preferably 210,000 g/mol or more, and most preferably 215,000 g/mol or more. The weight average molecular weight of the monovinyl aromatic polymer should be sufficiently low so that the material can be easily produced and/or processed. The weight average molecular weight of the monovinyl aromatic polymer may be about 300,000 g/mol or less, about 280,000 g/mol or less, about 260,000 g/mol or less, or about 240,000 g/mol or less. It will be appreciated that polymers having a weight average molecular weight of about 300,000 g/mol or more may also be employed. The monovinyl aromatic polymer preferably has a z-average molecular weight of about 300,000 g/mol or more, more preferably about 330,000 g/mol or more, even more preferably about 360,000 g/mol, and most preferably about 390,000 g/mol or more. The monovinyl aromotic polymer preferably has a z-average molecular weight of about 1,000,000 g/mol or less. The polydispersity index of the monovinyl aromatic polymer should be sufficiently high so that the polymer has a sufficient concentration of long chains for improving the resistance to environmental stress cracking. Preferably, the polydispersity index of the monovinyl aromatic polymer is about 2.0 or more, more preferably about 2.1 or more, even more preferably about 2.3 or more, even more preferably about 2.5 or more, even more preferably about 2.7 or more and most preferably about 3.0 or more. The polydispersity index of the monovinyl aromatic polymer preferably is about 8 or less, more preferably about 5 or less, and most preferably about 4 or less.

The monovinyl aromatic polymer is rubber modified using one or more elastomeric polymers (present as rubber particles). The elastomeric polymer (i.e., rubber) may be any rubber suitable for improving the impact resistance and/or the resistance to environmental stress cracking when present in a monovinyl aromatic polymer. The elastomeric polymer preferably is an unsaturated rubbery polymer or other polymer capable of forming a graft copolymer during the polymerization of the monovinyl aromatic polymer. The elastomeric polymer preferably has a glass transition temperature (Tg) of about 0° C. or less, more preferably about −10° C. or less, and most preferably about −20° C. or less, as determined by ASTM D-756-52T using differential scanning calorimetry. The glass transition temperature is the temperature or temperature range at which an elastomeric polymeric material shows an abrupt change in its physical properties, including, for example, mechanical strength and/or viscosity.

Exemplary elastomeric polymers include, but are not limited to, diene rubbers, diene block rubbers, butyl rubbers, ethylene-propylene rubbers, ethylene-propylene-diene monomer (EPDM) rubbers, ethylene copolymer rubbers, acrylate rubbers, polyisoprene rubbers, halogen containing rubbers, silicone rubbers and mixtures of two or more of these rubbers. Interpolymers of rubber-forming monomers with other copolymerizable monomers may also be used. Exemplary diene rubbers include, but are not limited to, conjugated 1,3-dienes, for example, butadiene, isoprene, piperylene, chloroprene, or mixtures of two or more of these dienes. Exemplary rubbers also include homopolymers of conjugated 1,3-dienes and interpolymers of conjugated 1,3-dienes with one or more copolymerizable monoethylenically unsaturated monomers, for example, copolymers of isobutylene and isoprene. Particularly preferred elastomeric polymers include, consist essentially of, or consist entirely of butadiene. For example, the concentration of butadiene in the elastomeric polymer may be about 10 weight percent or more, about 30 weight percent or more, about 50 weight percent or more, about 70 weight percent or more, about 75 weight percent or more, or about 90 weight percent or more, based on the total weight of the elastomeric polymer.

Preferred elastomeric polymers include diene rubbers such as polybutadiene, polyisoprene, polypiperylene, polychloroprene, and the like or mixtures of diene rubbers, i.e., any rubbery polymers of one or more conjugated 1,3-dienes, with 1,3-butadiene being especially preferred. Such rubbers include homopolymers and copolymers of 1,3-butadiene with one or more copolymerizable monomers, such as monovinyl aromatic monomers as described above, styrene being preferred. Preferred copolymers of 1,3-butadiene are block or tapered block rubbers including i) about 30 weight percent, more preferably about 50 weight percent or more, even more preferably at about 70 weight percent or more, and most preferably about 90 weight percent or more 1,3-butadiene rubber, and ii) about 70 weight percent or less, more preferably about 50 weight percent or less, even more preferably about 30 weight percent or less, and most preferably about 10 weight percent or less monovinyl aromatic monomer; where all weights based on the total weight of the 1,3-butadiene copolymer. Preferred elastomeric polymers have a solution viscosity in the range of about 5 to about 300 cP (5 percent by weight in styrene at 20° C.) and/or a Mooney viscosity of about 5 to about 100 (ML 1+4, 100° C.), for example as measured according to ASTM D 1646.

The elastomeric polymer in the rubber-modified polymers of this invention, for purposes of maintaining reduced cost and good physical property combinations (e.g., high modulus) may be present in an amount of about 10 weight percent or less, preferably about 8 weight percent or less, more preferably about 7.5 weight percent or less, even more preferably about 7.3 weight percent or less, even more preferably about 7.1 weight percent or less, and most preferably about 6.9 weight percent or less based on the total weight of the composition and/or based on the weight of rubber modified polymer. The elastomeric polymer is typically present in an amount as needed to provide sufficient toughness and tensile strength for a given application and/or sufficient resistance to environmental stress cracking. The elastomeric polymer may be present in an amount of about 1 weight percent or more, preferably about 2 weight percent or more, more preferably about 3 weight percent or more, even more preferably about 4 weight percent or more, and most preferably about 5 weight percent or more, based on the total weight of the composition and/or based on the total weight of rubber modified monovinyl aromatic polymer. Typically, HIPS products contain less rubber than ABS products.

Preferably, the concentration of the elastomeric polymer is sufficiently high and/or the concentration of the mineral oil is sufficiently high so that the composition has a tensile modulus (as measured according to ISO 527-1) of about 2200 MPa or less, more preferably about 2000 MPa or less, even more preferably about 1950 MPa or less, and most preferably about 1900 MPa or less. Preferably, the concentration of the elastomeric polymer is sufficiently high and/or the concentration of the mineral oil is sufficiently high so that the composition has a flexural modulus (as measured according to ISO 178) of about 2200 MPa or less, more preferably about 2000 MPa or less, even more preferably about 1950 MPa or less, and most preferably about 1900 MPa or less.

The elastomeric polymer preferably is present as rubber particles. Some or all of the rubber particles may be present as grafted and/or occluded rubber particles dispersed in the monovinyl aromatic polymer matrix. The rubber particles preferably are cross-linked. The cross-linking may be characterized by the light absorption ratio (i.e., Brinkmann). The elastomeric polymer in the composition preferably has a cross-link density that is sufficiently high so that the light absorption ratio (Brinkmann) is about 0.5 or more, more preferably about 0.55 or more, and most preferably about 0.6 or more. The elastomeric polymer preferably have a cross-link density that is sufficiently low so that the light absorption ratio (Brinkmann) is about 0.80 or less, more preferably about 0.75 or less, and most preferably about 0.70 or less The rubber particles in the compositions according to the present invention should have a particle size sufficiently high large so that the composition has good resistance to environmental stress cracking. The rubber particles preferably have a volume average diameter of at least about 3 micrometers or more, more preferably about 4 μm or more, even more preferably about 5 μm or more, and most preferably about 6 μm or more. Such rubber particles have a surprisingly high particle size particularly for compositions having a low concentration of elastomeric polymer and a monovinyl aromatic polymer having a high molecular weight. High rubber particle size may be achieved using a process that includes a first reaction step that polymerizes some of the monovinyl aromatic monomer and produces rubber particles of sufficiently high diameter, and an additional reaction step that increases the molecular weight of the monovinyl aromatic polymer without significantly reducing the size of the rubber particles. The volume average diameter of the rubber particles preferably is about 30 μm or less, more preferably about 20 μm or less, even more preferably about 15 μm or less, even more preferably about 10 μm or less, and most preferably about 8 μm or less. As used herein, the volume average rubber particle size or diameter refers to the diameter of the rubber particles, including all occlusions and grafts. Particle sizes in these ranges can typically be measured using the electro sensing zone method, such as the "Multisizer" brand equipment provided by Beckman Coulter, Inc. or using measurement techniques based on light scattering (Malvern Mastersizer, Beckman Coulter LS 230). If needed, transmission electron microscopy analysis can be used for rubber particle size and morphology analysis. Those skilled in the art recognize that different sized groups of rubber particles may require some selection or modification of rubber particle measurement techniques for optimized accuracy.

The compositions of this invention can further comprise one or more fillers and/or additives as long as they do not detrimentally affect the desired property combinations that are otherwise obtained or, preferably, they would improve one or more of the properties. For example, plasticizers (preferably mineral oil) is one such additive for HIPS that may improve the ESCR of HIPS. These materials are added in known amounts using conventional equipment and techniques. Other representative fillers include talc, calcium carbonate, organo-clay, glass fibers, marble dust, cement dust, feldspar, silica or glass, fumed silica, silicates, alumina, various phosphorus compounds, ammonium bromide, antimony trioxide, antimony trioxide, zinc oxide, zinc borate, barium sulfate, silicones, aluminum silicate, calcium silicate, titanium oxides, glass micro spheres, chalk, mica, clays, wollastonite, ammonium octamolybdate, intumescent compounds, expandable graphite, and mixtures of two or more of these materials. The fillers may carry or contain various surface coatings or treatments, such as silanes, fatty acids, and the like. As discussed above, the composition may optionally include a plasticizer. Preferably, the concentration of the plasticizer (e.g., the concentration of the mineral oil) is greater than 2 weight percent, more preferably about 2.3 weight percent or more, and most preferably about 2.6 weight percent or more, based on the total weight of the composition. The concentration of the plasticizer (e.g., the concentration of the mineral oil), if employed, is preferably about 8 weight percent or less, more preferably about 6 weight percent or less, even more preferably about 5 weight percent or less, even more preferably about 4 weight percent or less, and most preferably about 3.6 weight percent or less, based on the total wait of the composition.

Still other additives include flame retardants such as the halogenated organic compounds. The composition can also contain additives such as, for example, antioxidants (e.g., hindered phenols such as, for example, IRGANOX™1O76 a registered trademark of BASF resins), mold release agents, processing aids other than mineral oil (such as other oils, organic acids such as stearic acid, metal salts of organic acids), colorants or pigments to the extent that they do not interfere with desired physical or mechanical properties of the compositions of the present invention.

Process for Preparing the Rubber Modified Polymer

Although any of the generally well-known processes to make the rubber-modified monovinyl aromatic polymers can be used, a preferred process is based on polymerizing monovinyl aromatic monomer(s) (and any optional comonomer) to make the polymer in the presence of the rubber. The process may use one or more reactors and/or one or more reaction zones. For example, the process may include multiple reactors and/or multiple reaction zones connected in series. As known to those skilled in the art, these reactors/zones can use the same or different initiators/reactants and/or be operated at different conditions, e.g., different reactant concentrations, temperatures, pressures, etc. to provide a range of features and variations in the monovinyl aromatic polymers. This process provides a desirable rubber-modified monovinyl aromatic polymer composition comprising a dispersion of rubber particles, preferably grafted with monovinyl aromatic polymer, in the monovinyl aromatic polymer matrix. The process may include one or any combination of the steps and/or features described in U.S. Pat. No. 4,144,204 (see for example column 2, line 21 to column 8, line 16), U.S. Pat. No. 4,666,987 (see for example column 2, line 56 to column 5, line 52), U.S. Pat. No. 4,572,819 (see for example, FIG. 1, FIG. 2, FIG. 3. and column 2, line 25 to column 7, line 57), and U.S. Pat. No. 4,585,825 (see e.g., FIG. 1, FIG. 2, FIG. 3, FIG. 4, and column 4, line 44 to column 21, line 24), U.S. Pat. No. 6,353,066 B1 (see e.g., FIG. 1, FIG. 2, FIG. 3, and column 2, line 18 to column 5, line 24), U.S. Pat. No. 6,350,813 (see for example column 1, line 66 to column 6, line 48), and US Patent Application Publication No. US2011/218292 (see for example paragraphs 0018 to 0068) all incorporated herein by reference in their entirety.

The process may include one or more steps of cross-linking the rubber. A cross-linking step may occur at any time in the process (e.g., before, after, or during the polymerization of the monovinyl aromatic monomer) Preferably, the process includes a crosslinking reaction following a step of polymerizing the monovinyl aromatic monomer. For example, a crosslinking reaction of the rubber may take place during the formation of the product, during a devolatilization step, or both.

The concentration of the elastomeric polymer preferably is sufficiently low so that the composition has a high tensile modulus that allows for down gauging without compromising the mechanical performance. The concentration of the elastomeric polymer may be sufficiently low so that the composition has a tensile modulus of about 1400 MPa or more, preferably about 1500 MPa or more, and most preferably about 1600 MPa or more.

The compositions according to the teachings herein may be characterized by one or more (e.g., two or more, three or more, or even all) of the following: a melt flow rate of about 50 g/10 min or less (preferably about 10 g/10 min or less, and more preferably about 5 g/10 min or less); a melt flow rate of about 0.5 g/10 min or more (preferably about 1 g/10 min or more, and more preferably about 2 g/10 min or more); a Vicat softening point (measured at 120/1) of about 60° C. or more, more preferably about 75° C. or more, and most preferably about 90° C. or more); a tensile yield of about 12.0 MPa or more (preferably about 14.5 or more, more preferably about 15.5 MPa or more, and most preferably about 16.0 MPa or more); a tensile elongation of about 30% or more (preferably about 40% or more, and more preferably about 50% or more); an tensile modulus of about 1000 MPa or more (preferably about 1400 MPa or more, more preferably about 1500 MPa or more, and most preferably about 1600 MPa or more); a Notched Izod measured at −20° C. of about 3 kJ/m$^2$ or more (preferably about 4 kJ/m$^2$ or more, and more preferably about 5 kJ/m$^2$ or more); or a heat distortion temperature (measured with a stress of 0.45 MPa) of about 60° C. or more (preferably about 70° C. or more, more preferably about 80° C. or more).

Particularly preferred compositions are substantially free of, or entirely free of thermoplastic polyolefins having a melting temperature greater than or equal to 50° C. and/or a crystallinity of about 10% or more. For example, the composition may be substantially free of, or entirely free of one or any combination of the following thermoplastic polyolefins: polyethylenes, polypropylenes, ethylene/α-olefin copolymers, or propylene α-olefin copolymers. If present, the concentration of any thermoplastic polyolefin preferably is about 5 weight percent or less, more preferably about 2 weight percent or less, even more preferably about 1 weight percent or less, and most preferably about 0.5 weight percent or less.

Applications

The compositions according to the teachings herein may be formed into an article using any forming and/or shaping process. For example, the composition may be formed into an article using a process that includes extrusion, injection molding, blow molding, casting, thermoforming, or any combination thereof. The article may be in any form generally used in forming polymer compositions. Without limitation, the article may be a film, a fiber, a sheet structure, a molded object, a blow molded object, an extruded profile, a thermoformed shape, and the like. The compositions may be used in transportation (e.g., automotive) or other non-transportation applications such as industrial applications and appliance applications. The compositions according to the teachings herein may be used in hoses, refrigerator liners and other liners (appliance or otherwise), clothing and footwear components, gaskets and the like.

Test Methods

Molecular Weight Distribution

Unlike small molecules, the molecular weight of a polymer is generally not one unique value. Rather, a given polymer will have a molecular weight distribution. The distribution generally will depend on the way the polymer is produced. For polymers the distribution of molecular weight is a function P(M), where P(Mi) is the probability, or fraction of molecules having a molecular weight Mi. As used herein, molecular weight distribution describes the distribution of the molecular weight of a polymer. The molecular weight of the monovinyl aromatic polymer, refers to the molecular weight of the soluble fraction of the matrix. The molecular weight may be measured using gel permeation chromatography. Different solvents can be used, a typical solvent is tetrahydrofuran. Polystyrene standards may be used for calibration. The average molecular weight may be characterized by the number average molecular weight (i.e., Mn), the weight average molecular weight (i.e., Mw), the z-average molecular weight (i.e., Mz), or any combination thereof. The polydispersity index is defined as the ratio of the weight average molecular weight, Mw, and the number average molecular weight, Mn.

Swelling Index

The swelling index, Q, is measured according to the method described in U.S. Pat. No. 4,144,204 (column 5, lines 35-54). The composition is placed in toluene at 25° C. After the soluble polymer dissolves in the toluene, the solution is centrifuged to separate the liquid polymer solution and the undissolved polymer (e.g., the insoluble gel constituent). After centrifuging, the liquid is decanted, thus isolating the swollen insoluble polymer (i.e., the wet gel). The mass of the wet gel is measured. The wet gel is dried to remove the toluene. The mass of the dry gel is then measured. The swelling index, Q, is defined as the ratio of mass of the wet gel to the mass of the dry gel. The swelling index is related to the concentration of cross-links in the rubber particles. A high swelling index is characteristic of a polymer having a low concentration of cross-links. A low swelling index is characteristic of a polymer having a high concentration of cross-links.

Gel Content

The gel content is a measure for the amount cross-linked rubber, graft layer and occlusions. The composition is initially weighted and then heated under nitrogen to a temperature of about 280° C. for about 2 hours to fully cross-link the rubber. The composition is then placed in toluene at 25° C. The toluene and soluble polymer is removed. The remaining gel is dried and then reweighed. The gel content is the weight percent of the composition that remains in the dried gel, expressed in units of weight percent.

Light Absorbance Ratio (i.e., LAR)

The amount of rubber cross-linking may be quantified by the light absorbance ratio (LAR). LAR is the ratio of light absorbance for a suspension of the rubber particles in dimethyl formamide (DMF) and the light absorbance for a suspension of the rubber particles in dichloromethane (DCM). LAR may be determined using a Brinkmann model PC 800 probe colorimeter equipped with a 450 nm wavelength filter, from Brinkmann Instruments Inc., Westbury, N.Y., or equivalent. In a first vial, a 0.4 gram (g) sample of rubber-modified copolymer is dissolved in 40 milliliters (ml) DMF. From the first vial, 5 ml of the resulting DMF solution is added to a second vial containing 40 ml of DMF. From the first vial, 5 ml of the resulting DMF solution is added to a third vial containing 20 ml DCM. The probe is zeroed in neat DMF. The absorption of the DMF solution (i.e., $A_{DMF}$) in the second vial and the absorption of the DCM solution (i.e., $A_{DCM}$) in the third vial are determined. The light absorbance ratio is calculated by the following equation:

$$LAR = A_{DMF}/A_{DCM}$$

Melt Flow Rate

The melt flow rate of the composition is measured according to ISO 1133, Condition G at 200° C./5 kg.

Tensile Properties

The tensile modulus (i.e., elastic modulus), the tensile elongation, and the tensile rupture are all measured according to ISO 527-2. The elongation rate may be about 50 mm/min (e.g., for ABS) or about 5 mm/min (e.g., for HIPS). Test specimens may be conditioned at 23° C. and 50 percent relative humidity 24 hours prior to testing. Testing may be performed at 23° C. using a Zwick Z010 mechanical tester, or equivalent testing apparatus. Unless otherwise stated, tensile properties are measured on injection molded samples, with the length of the sample in the strong direction.

Flexural Modulus

The flexural modulus is measured according to ISO 178. Unless otherwise stated, flexural modulus is measured on injection molded samples, with the length of the sample in the strong direction.

Charpy Impact Strength

The Charpy Impact Strength is measured according to ISO 148 using a test specimen having dimensions 10 mm×10 mm×55 mm at a test temperature of 23° C. or −20° C. Notched (V-notch) Charpy is determined according to the ISO 179 1eA at 23° C.

Izod Impact Strength

The Notched Izod impact resistance is measured according to ISO 180/1A at a test temperature of 23° C. or −20° C. Notched Izod may be determined according to one of the following standards: ISO 180/1.

Vicat Softening Temperature

The Vicat softening temperature is a measured according to ISO 306 at a heating rate 120° C./hour and a load of 10 N.

Heat Deflection Temperature

The heat deflection temperature is measured according to ISO 78.

Rubber Particle Size

The rubber particle size is measured using Coulter Multisizer II or lie using the electrosensing technique. The set-up may employ the ACCUCOMP™ Software Version 2.01. About 3 granules of polymer samples (30-70 mg) is dissolved in 5 ml of DMF, using sonication for approximately 15 to 20 minutes. About 10 ml of an electrolyte solution (1 percent $NH_4SCN$ in DMF) is mixed with 0.2 ml of the sample solution. The appropriate Coulter tube (e.g. for HIPS=30 μm aperture) is used in combination with a calibration material. The coincidence level indicator of the apparatus should read between 5 and 10 percent. If the coincidence level is above 10 percent, the sample solution is diluted with electrolyte solution. If the coincidence level is too low, more drops of the polymer solution in DMF is added. The volumetric mean particle size is reported in micrometer (μm).

ESCR (Resistance to Environmental Stress Cracking)

"ESCR" is measured consistent with International Standard ISO-4599. Test specimens are molded for tensile testing consistent with ISO-527. The test procedure requires measuring a tensile property (e.g., elongation at break) of the test specimens (bars) of the candidate resin(s) before and after they are immersed in corn oil under measured strain. The temperature during the test is 23±2° C., and the test bar samples are clamped into a frame that applies 1.0% strain (sometimes 0.5% strain is applied). The test bar, being held under strain in the frame, is held submerged in corn oil for n days (where n is 4 and 10 days). After the specified time, the bars are removed from the corn oil, removed from the frame, cleaned and tested using tensile testing. The percentage elongation at break, stress at failure, stress at yield, and tensile modulus are measured. From the before and after tensile test (e.g., elongation test) results, the retention percentage is calculated by dividing the tensile test value of the ESCR sample by the tensile test value for the unsubmerged bar, and then multiply by 100 to convert to units of percent. This property retention value is referred to as the "environmental stress crack resistance" and is shown as "ESCR 1% strain" or "ESCR 0.5% strain" depending on the strain applied. The criterion for generally successful or sufficient ESCR performance is that test specimens exposed at 1% strain after 10 days immersion retain at least 15%, and preferably at least about 30% of the value of the tested tensile property (e.g., elongation) measured on unexposed test specimens.

Rubber Concentration/Composition

The composition of the resin may be determined using Fourier Transform Infrared spectroscopy. The sample may be pressed or otherwise transformed into a thin film. This technique may be employed to measure the amount of acrylonitrile (i.e., AN), N-phenyl maleimide (i.e., N-PMI), n-butyl acrylate (i.e., nBA), polybutadiene, or any combination thereof. For example infrared spectroscopy may be used to determine the amount of polybutadiene originating from the rubber.

The amount of polybutadiene may also be determined using a titration technique. For example, a known amount of sample may be dissolved in ortho-dichlorobenzene. A known amount of solution of Wijs is added which reacts with the unsaturated bonds of the polybutadiene present in the sample. After 60 min of reacting in the dark the amount of Iodine monochloride which did not react is reacted with potassiumiodide to iodine. The iodine may then be titrated with sodiumthiosulfate. The polybutadiene content may be calculated from the amount of sodiumthiosulfate needed to titrate the iodine.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are Incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

EXAMPLES

Example 1 is prepared using a sufficient amount of polybutadiene rubber to result in a final rubber concentration of 7.8 weight percent in the final composition. Styrene monomer is polymerized in the presence of the rubber under dynamic conditions for controlling the rubber particle size, after phase Inversion, as the polymerization proceeds. The polymerization of the styrene results in monovinyl aromatic polymer that is grafted to the rubber and monovinyl aromatic polymer that is not grafted to the rubber. At an early time in the polymerization, there are no rubber particles, and the rubber phase is the continuous phase. At this early time the polystyrene is present as particles. At a later time, after phase inversion, the polystyrene becomes the continuous phase and the rubber phase is present as a discontinuous phase (i.e., discrete particles). About 3.0 weight percent mineral oil is present in the rubber-modified monovinyl aromatic polymer, being added prior to the polymerization of the styrene. The composition and properties of Example 1 are shown in Table 1 and Table 2 below.

Example 2

Example 2 is prepared using a sufficient amount of polybutadiene rubber to result in a final rubber concentration of 6.6 weight percent in the final composition. Styrene monomer is polymerized in the presence of the rubber under dynamic conditions for controlling the rubber particle size, after phase inversion, as the polymerization proceeds. The polymerization of the polystyrene results in monovinyl aromatic polymer that is grafted to the rubber particles and monovinyl aromatic polymer that is not grafted to a rubber particle. At an early time in the polymerization, there are no rubber particles, and the rubber phase is the continuous phase. At this early time the polystyrene is present as particles. At a later time, after phase inversion, the polystyrene becomes the continuous phase and the rubber phase is present as a discontinuous phase. About 2.7 weight percent mineral oil is present in the rubber-modified monovinyl aromatic polymer, being added prior to the polymerization of the styrene. The composition and properties of Example 2 are shown in Table 1 and Table 2 below. The flexural modulus of Example 2 is increased by about 10% or more (e.g., about 15% or more) compared with Example 1. The tensile modulus of Example 2 is increased by about 10% or more (e.g., about 15% or more) compared with example 1. Despite having a generally high concentration of monovinyl aromatic polymer and a generally low concentration of elastomeric polymer, Example 2 has improved resistance to environmental stress cracking compared with Example 1, as shown by the increase in retention of properties after immersion in corn oil at 4 and 10 days.

TABLE 1

|  |  | Example 1 | Example 2 |
|---|---|---|---|
| Composition |  |  |  |
| Monovinyl aromatic polymer | wt. % | 89.2 | 90.7 |
| Elastomeric polymer | wt. % | 7.8 | 6.6 |
| Mineral Oil | wt. % | 3.0 | 2.7 |
| Elastomeric Polymer | Type | Polybutadiene | Polybutadiene |
| Monovinyl aromatic monomer | Type | Styrene | Styrene |
| Properties of soluble monovinyl aromatic polymer | | | |
| Molecular weight | | | |
| Mz | g/mol | 280,000-330,000 | 437,000 |
| Mw | g/mol | 160,000-197,000 | 217,000 |
| Mn | g/mol | 75,000-98,000 | 68,500 |
| Polydispersity Index |  | 2.00-2.08 | 3.16 |
| Properties of composition | | | |
| Melt flow rate | g/10 min | 2.6 | 3.6 |
| Gel content | % | 31.1 | 27.8 |
| Swelling index | % | 10.9 | 11.7 |
| Light Absorbance Ratio |  | 0.67 | 0.69 |
| Heat deflection temperature | | | |
| Measured at 0.45 MPa | ° C. | 81 | 82 |
| Measured at 1.82 MPa | ° C. | 68 | 67 |
| Vicat softening point (120/1) | ° C. | 98 | 98 |
| Impact strength, notched Izod | | | |
| Measured at 23° C. | kJ/m$^2$ | 10.8 | 8.6 |
| Measured at −20° C. | kJ/m$^2$ | 8.2 | 6.0 |
| Impact strength, notched Charpy | | | |
| Measured at 23° C. | kJ/m$^2$ | 10.7 | 8.1 |
| Measured at −20° C. | kJ/m$^2$ | 7.8 | 6.3 |
| Tensile Properties | | | |
| Stress at yield | MPa | 14.2 | 16.6 |
| Stress at rupture | MPa | 22.3 | 22.5 |
| Elongation (at rupture) | % | 94 | 56 |
| Elastic Modulus | MPa | 1390 | 1630 |
| Flexural Properties Elastic Modulus | MPa | 1515 | 1800 |

TABLE 2

Environmental Stress Crack Resistance

| | | Example 1 | Example 2 |
|---|---|---|---|
| ESCR (corn oil, 4 days, 0.5% strain) | | | |
| Measured Tensile Properties | | | |
| Stress at yield | MPa | 14.1 | 16.8 |
| Stress at rupture | MPa | 19.3 | 20.3 |
| Elongation (at rupture) | % | 55 | 36 |
| Elastic Modulus | MPa | 1340 | 1640 |
| Retention of Tensile Properties | | | |
| Stress at yield | % retention | 99 | 10 |
| Stress at rupture | % retention | 87 | 90 |
| Elongation (at rupture) | % retention | 59 | 64 |
| Elastic Modulus | % retention | 96 | 101 |
| ESCR (corn oil, 4 days, 1% strain) | | | |
| Measured Tensile Properties | | | |
| Stress at yield | MPa | 13.5 | 16.2 |
| Stress at rupture | MPa | 15.7 | 19.9 |
| Elongation (at rupture) | Percent | 26 | 34 |
| Elastic Modulus | MPa | 1300 | 1580 |
| Retention of Tensile Properties | | | |
| Stress at yield | % retention | 95 | 98 |
| Stress at rupture | % retention | 70 | 88 |
| Elongation (at rupture) | % retention | 28 | 61 |
| Elastic Modulus | % retention | 94 | 97 |
| ESCR (corn oil, 10 days 0.5% strain) | | | |
| Measured Tensile Properties | | | |
| Stress at yield | MPa | 13.9 | 16.6 |
| Stress at rupture | MPa | 18.8 | 20.4 |
| Elongation (at rupture) | % | 54 | 37 |
| Elastic Modulus | MPa | 1380 | 1665 |
| Retention of Tensile Property | | | |
| Stress at yield | % retention | 98 | 100 |
| Stress at rupture | % retention | 84 | 91 |
| Elongation (at rupture) | % retention | 57 | 66 |
| Elastic Modulus | % retention | 99 | 102 |
| ESCR (corn oil, 10 days, 1% strain) | | | |
| Measured Tensile Properties | | | |
| Stress at yield | MPa | 13.4 | 16.0 |
| Stress at rupture | MPa | 16.5 | 21.3 |
| Elongation (at rupture) | % | 36 | 45 |
| Elastic Modulus | MPa | 1340 | 1605 |
| Retention of Tensile Property | | | |
| Stress at yield | % retention | 94 | 96 |
| Stress at rupture | % retention | 74 | 95 |
| Elongation (at rupture) | % retention | 38 | 80 |
| Elastic Modulus | % retention | 96 | 98 |

What is claimed is:

1. A composition comprising:
   a rubber-modified monovinyl aromatic polymer
   i) including about 90 weight percent or more of a monovinyl aromatic polymer matrix, based on the total weight of the rubber-modified monovinyl aromatic polymer; and
   ii) from about 2 to about 7.5 weight percent of one or more elastomeric polymers, based on the total weight of the composition; wherein the one or more elastomeric polymers are cross-linked and have a volume average diameter of 5 μm to 30 μm; and
   greater than 2 weight percent to 7 weight percent mineral oil, based on the total weight of the composition;
   wherein the monovinyl aromatic polymer matrix is derived from one or more monovinyl aromatic monomers, and the monovinyl aromatic polymer matrix has a sufficiently high molecular weight so that the retention in the elongation at break after 10 days in corn oil at 1% strain is about 15% or more;
   the monovinyl aromatic polymer matrix is sufficiently rigid so that the composition has a tensile modulus of about 1500 MPa or more as measured according to ISO 527-2; and
   the monovinyl aromatic polymer matrix includes a soluble portion that is soluble in tetrahydrofuran at 25° C. and an insoluble portion that is insoluble in tetrahydrofuran at 25° C., wherein the molecular weight of the soluble portion of the monovinyl aromatic polymer matrix is characterized by a weight average molecular weight of 200,000 to about 280,000 g/mol and a polydispersity index of 3.0 or more; and
   the composition has a gel content in 25° C. toluene of about 27.8 weight percent to about 31.1 weight percent, after heating to 280° C. for 2 hours under nitrogen.

2. The composition of claim 1, wherein the elastomeric polymer has an average diameter from 6 μm to 15 μm, and the elastomeric polymer includes at least 75 weight percent butadiene monomer based on the total weight of the elastomeric polymer.

3. The composition of claim 1, wherein the soluble portion of the monovinyl aromatic polymer matrix has a weight average molecular weight of 205,000 g/mol or more, and includes about 95 weight percent to about 100 weight percent styrene, based on the total weight of the monvinyl aromatic polymer matrix.

4. The composition of claim 3, wherein the elastomeric polymer is present as grafted and cross-linked rubber particles dispersed within the monovinyl aromatic polymer matrix.

5. The composition of claim 4, wherein the monovinyl aromatic polymer matrix consists essential of styrene, and is sufficiently rigid and the concentration of the elastomeric polymer is sufficiently low so that the tensile modulus of the composition is about 1600 MPa or more.

6. The composition of claim 5, wherein the one or more elastomeric polymers are present in an amount from about 3 to about 7.1 weight percent, based on the total weight of the composition.

7. The composition of claim 6, wherein the rubber-modified monovinyl aromatic polymer is a reactor blend having the one or more monovinyl aromatic monomers polymerized in the presence of the one or more elastomeric polymers.

8. The composition of claim 7, wherein the molecular weight distribution of the soluble portion of the monovinyl aromatic polymer is characterized by a polydispersity index of 3.0 to 8.

9. The composition of claim 8, wherein the soluble portion of the monovinyl aromatic polymer is characterized by a z-average molecular weight of about 360,000 g/mol or more.

10. The composition of claim 9, wherein the concentration of the elastomeric polymer is about 4 weight percent or more based on the total weight of the composition, and wherein, and the elastomeric polymer has an average diameter from 6 μm to 15 μm.

11. The composition of claim 10, wherein the composition consists of the monovinyl aromatic polymer, the elastomeric polymer and the mineral oil.

12. A composition consisting of:
a rubber-modified monovinyl aromatic polymer consisting of
  i) about 90 weight percent or more of a monovinyl aromatic polymer matrix, based on the total weight of the rubber-modified monovinyl aromatic polymer; and
  ii) from about 2 to about 7.5 weight percent of one or more elastomeric polymers, based on the total weight of the composition; wherein the one or more elastomeric polymers is cross-linked and have a volume average diameter of 5 μm to 30 μm; and
greater than 2 weight percent to 7 weight percent mineral oil, based on the total weight of the composition;
wherein the monovinyl aromatic polymer matrix is derived from one or more monovinyl aromatic monomers, and the monovinyl aromatic polymer matrix has a sufficiently high molecular weight so that the retention in the elongation at break after 10 days in corn oil at 1% strain is about 15% or more;
the monovinyl aromatic polymer matrix is sufficiently rigid so that the composition has a flexural modulus of about 1500 MPa or more as measured according to ISO 178; and
the monovinyl aromatic polymer matrix includes a soluble portion that is soluble in tetrahydrofuran at 25° C. and an insoluble portion that is insoluble in tetrahydrofuran at 25° C., wherein the molecular weight of the soluble portion of the monovinyl aromatic polymer matrix is characterized by a weight average molecular weight of 200,000 to about 280,000 g/mol and a polydispersity index of 2.7 or more; and
the composition has a gel content in 25° C. toluene of about 27.8 weight percent to about 31.1 weight percent, after heating to 280° C. for 2 hours under nitrogen.

13. The composition of claim 1, wherein
the soluble portion of the monovinyl aromatic polymer is characterized by a weight average molecular weight of 205,000 g/mol or more;
the molecular weight distribution of the soluble portion of the monovinyl aromatic polymer is characterized by a polydispersity index of 3.0 or more;
the monovinyl aromatic polymer includes about 95 weight percent or more styrene, based on the total weight of the monovinyl aromatic polymer;
the concentration of the elastomeric polymer is sufficiently low so that the tensile modulus of the composition is about 1700 MPa or more;
the monovinyl aromatic polymer is characterized by a z-average molecular weight of about 360,000 g/mol or more;
the concentration of the elastomeric polymer is 7.1 weight percent or less, based on the total weight of the composition;
the concentration of the elastomeric polymer is about 4 weight percent or more based on the total weight of the composition; and
the elastomeric polymer includes at least 75 weight percent butadiene monomer based on the total weight of the elastomeric polymer.

14. The composition of claim 13, wherein the elastomeric polymer has an average diameter from 6 μm to 15 μm.

15. A refrigerator liner including a composition of claim 13.

16. The refrigerator liner of claim 15, wherein the refrigerator liner is characterized by ESCR performance determined by retention in elongation at break after 10 days in corn oil at 1% strain of about 15% or more.

17. A process including a step of extruding and/or thermoforming the composition of claim 13 to form a refrigerator liner.

18. A method of forming a composition comprising the steps of:
  i) polymerizing one or more monovinyl aromatic monomers in the presence of one or more elastomeric polymers and cross-linking the one or more elastomeric polymers in a devolatilization step to form a rubber-modified monovinyl aromatic polymer; including a soluble portion that is soluble in tetrahydrofuran at 25° C. and an insoluble portion that is insoluble in tetrahydrofuran at 25° C., wherein the molecular weight of the soluble portion of the a monovinyl aromatic polymer matrix is characterized by a weight average molecular weight of 200,000 to about 280,000 g/mol and a polydispersity index of 3.0 or more; and
  ii) preparing a polymeric composition by blending at least the rubber-modified monovinyl aromatic polymers and 2 weight percent to 7 weight percent of mineral oil;
wherein the rubber-modified monovinyl aromatic polymer includes:
  i) about 90 weight percent or more of the monovinyl aromatic polymer matrix, based on the total weight of the polymeric composition; and
  ii) from about 2 to about 7.5 weight percent of the one or more elastomeric polymers, based on the total weight of the rubber-modified monovinyl aromatic polymer;
wherein the one or more elastomeric polymers is cross-linked and has a volume average diameter of 5 μm to 30 μm;
the monovinyl aromatic polymer matrix has a sufficiently high molecular weight so that the retention in the elongation at break after 10 days in corn oil at 1% strain is about 15% or more;
the monovinyl aromatic polymer matrix is sufficiently rigid so that the composition has a tensile modulus of about 1500 MPa or more as measured according to 527-2; and
the composition has a gel content in 25° C. toluene of about 27.8 weight percent to about 31.1 weight percent, after heating to 280° C. for 2 hours under nitrogen.

19. The process of claim 18, wherein the elastomeric polymer has an average diameter from 6 μm to 15 μm.

20. The method of claim 19, wherein the monovinyl aromatic polymer matrix includes 95 weight percent or more styrene, based on the total weight of the monovinyl aromatic polymer matrix.

* * * * *